Nov. 1, 1960  F. C. ROBINSON ET AL  2,958,117
ELECTRICAL CAPACITORS
Filed Oct. 19, 1956
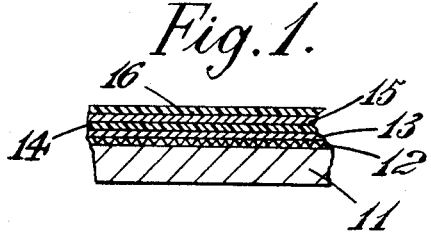
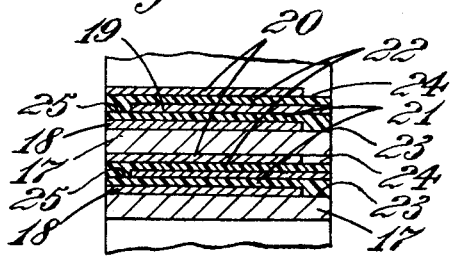
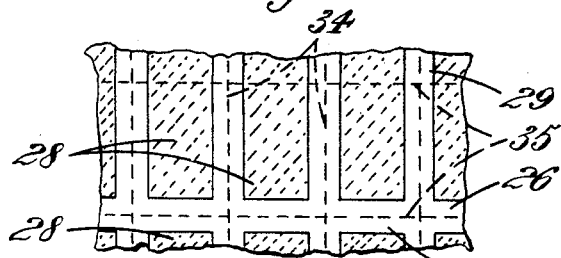
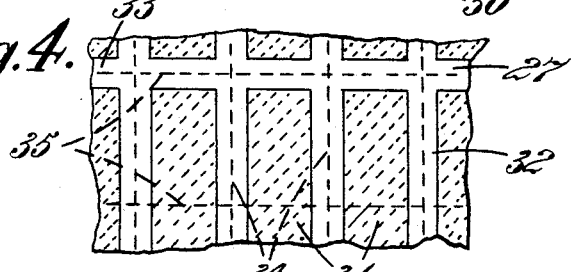
INVENTORS
FREDERICK C. ROBINSON
FREDERICK R. BECKETT
By Watson, Cole, Grindle & Watson
ATTORNEYS United States Patent Office 2,958,117
Patented Nov. 1, 1960

2,958,117

ELECTRICAL CAPACITORS

Frederick Chetham Robinson, London, and Frederick Richard Beckett, Coventry, England, assignors to A. H. Hunt (Capacitors) Limited, London, England, a British company Filed Oct. 19, 1956, Ser. No. 617,104

3 Claims. (Cl. 29—25.42)

This invention relates to electrical capacitors and in particular to capacitors of the kind comprising thin flexible dielectric strip material bearing metallised areas to constitute electrodes. One of the difficulties arising in making really small low voltage capacitors of this kind is the fact that, for reasons of mechanical strength during capacitor manufacture, the thickness of the dielectric strip employed might hitherto have needed to be considerably greater than would be determined by electrical requirements alone. The metallisation is too thin to possess any significant film strength on its own, and is only coherent by reason of its being carried by the dielectric.

According to the present invention, in a method of making electrical capacitors a plurality of layers of metallisation are deposited successively on the surface of a strip or sheet of insulating backing material, and each successive layer of metallisation is separated from the one beneath it by the application of a coating or layer of dielectric, for example in lacquer form, over the layer of metallisation beneath. In this way it is possible to build up a multiplicity of individually very thin fragile layers of electrode metallisation and dielectric and the backing sheet can provide the assembly with the necessary mechanical strength.

In one aspect, a small number of layers on the backing sheet, say two layers of metallisation and two layers of dielectric, may be wound to form a roll capacitor with the two metallised layers consttiuting the two electrodes. In another aspect, a relatively thick stack or pile of layers may be built up on the backing sheet and afterwards cut up into separate stacked capacitors. In either case, it will normally be necessary to carry out a demetallising operation on each layer of metallisation, before any further layers are placed over it, to produce desired patterns of metallised areas.

After the layers of metallisation and dielectric have been deposited, the backing strip may be stripped off or not as desired. If the backing strip is to be stripped off, a heat softenable release agent is preferably coated over its surface before the first layer is applied, in order that the backing strip may subsequently peel away easily, if necessary with slight heating; a heated roller may be used for this latter purpose. The backing strip may be of a material such as waxed paper, regenerated cellulose, or viscose, and the dielectric is preferably applied as a lacquer consisting of a synthetic plastic material, such as styrene resin or cellulose acetate, in liquid form.

Various methods in accordance with the invention will now be described by way of example, and with reference to the accompanying diagrammatic drawings in which:

Figure 1 is a cross-section of a composite strip comprising backing, release agent, and two layers each of metallisation and dielectric lacquer;

Figure 2 represents a partial radial section of a capacitor roll wound from a composite strip consisting of a backing carrying three layers of electrode metallisation and two interposed dielectric layers; and Figures 3 and 4 show in plan two succeeding layers of electrode metallisation built up on the same backing strip and demetallised into areas for cutting up subsequently into separate stacked capacitors.

In one method of carrying the invention into effect, a backing strip 11 (Figure 1) of flexible viscose film has one surface coated over with a paraffin wax release agent 12. A thin layer of metallisation 13, for example aluminium, is evaporated on to the coated surface of the backing strip, and the metallised strip is then passed through electrical demetallising apparatus which removes a marginal band of metal all along one edge of the metallised strip surface. After the demetallisation step, the surface of the backing strip bearing the metallisation is lacquered all over with styrene resin in the liquid state to form a dielectric layer 14.

When the lacquer has hardened, a further layer of metallisation 15 is evaporated on to the lacquered surface, and this second metallised layer is subjected to a similar demetallisation, with the exception that this time the margin from which the metal is removed is along the opposite edge of the strip. Finally a further coating 16 of styrene lacquer is applied to constitute a second dielectric layer.

A length of the composite strip is then wound into a capacitor roll so that the two metallised layers 13, 15 constitute electrodes of opposite polarity extending up to opposite ends of the roll. The backing strip 11 is, however, peeled off the dielectric and metal layers immediately prior to arrival at the winding spindle, and is reeled up on a separate spindle. To facilitate the stripping off of the backing, the composite strip is passed over a heated roller, with the backing next to the roller, so that the wax release agent is softened. After winding, the demetallised margins of the two electrode layers are at opposite radial faces of the roll, and the capacitor unit has terminal connections attached to opposite ends of the roll in the usual manner.

It will be appreciated that the above process might be carried out with more than two dielectric layers and electrode layers. Furthermore, it would be possible to make the first layer applied to the backing sheet a dielectric layer, and to finish with a layer of metallisation.

There are certain arrangements in which, provided that the small size of a capacitor unit is not a factor of prime importance, it may be found more convenient to wind the backing strip into the roll instead of stripping it off prior to winding, and the invention is intended to include this possibility within its scope. In any of these arrangements the backing strip will generally be so placed in relation to the dielectric layers and layers of metallisation that when a capacitor unit is wound the backing will not lie between electrodes of opposite polarity but will be in a field-free space between electrodes of the same polarity.

One way of achieving this is by starting with a layer of metallisation on the backing strip and then applying alternate layers of dielectric and metallisation until there are three or some higher odd number of metal layers, the top layer being a metal layer. Thus Figure 2 shows part of a radial section through a capacitor roll wound from a composite strip comprising a backing 17 bearing three distinct layers of electrode metallisation 18, 19, 20 separated by two intermediate layers of dielectric lacquer 21, 22. The first and third metal layers 18, 20 are of the same polarity and extend up to the same radial face of the roll, with demetallised margins 23, 24 spacing them from the opposite roll face. The intermediate metal layer 19 has a demetallised margin 25 on the side opposite the margins 23, 24 and it extends up to the opposite radial face of the roll to the layers 18, 20 being of opposite polarity thereto. The backing 17 therefore lies everywhere in the field-free space between the electrode layers 18 and 20 of the same polarity.

Another way would be to apply first a layer of metallisation and then a layer of dielectric to both sides of a backing strip, and then to put a further layer of metallisation on one or both sides of the backing strip over the initial metal and dielelectric layers, adding further dielectric and metal layers if desired, and to roll up a single length of the composite strip. The two metal layers contiguous with the opposite faces of the backing strip would again be connected up to be of the same polarity. There could also be occasions on which it might be desired to wind in the backing strip not in field-free space but to act as part of the dielectric of the capacitor.

In another example of a method embodying the invention, a backing sheet has a large number of alternate layers of metallisation and dielectric applied to it, each metal layer being demetallised to form a pattern of squares, rectangles or other shapes. Subsequently, the composite sheet so produced is cut up into individual stacked capacitors by slitting the sheet and punching out from it portions corresponding to the aforesaid shapes in the layers of metallisation. Figures 3 and 4 show in plan two succeeding layers of electrode metallisation applied one above the other on the same backing sheet 26 separated by a layer of dielectric lacquer 27. The lower electrode layer shown in Figure 3 is divided up after its deposition and by electrical demetallisation into rows of rectangular areas 28 separated by longitudinal demetallised paths 29 and lateral paths 30. When the dielectric layer 27 and the next layer of electrode metallisation have been applied over the patterned metal layer shown in Figure 3, said next layer of metallisation, seen in Figure 4, is then similarly subjected to electrical demetallisation to divide it up into rectangles 31 of the same areas as the rectangles 28 by longitudinal and lateral demetallised paths 32, 33, but whereas the longitudinal paths 32 lie directly over the paths 29, the lateral paths 33 lie midway between the paths 30 as viewed in plan so that the rectangular areas 31 are staggered in one direction with respect to the areas 28 below. It will be observed that when a large stack of dielectric layers and layers of metallisation with rectangular electrode areas staggered in this manner has been built up, by cutting up the stack into separate capacitor units along longitudinal lines 34 which bisect the paths 29, 32 and lateral lines 35 which both bisect the paths 30, 33 and the rectangular areas 28, 31, capacitor stacks are produced in which succeeding electrodes of opposite polarity extend up to opposite end edges of the stack.

After production of the stacked capacitors the pieces of the backing sheet could be peeled off or not, as desired, but if they are to be peeled off then a wax release agent should be used before the first layer is applied to the backing sheet.

In both the above-mentioned processes, for the manufacture of roll and stacked capacitors, it is important that there should be correct registration of the metallised and unmetallised areas in successive metal layers. Accordingly, the backing strip or sheet may be provided with marginal portions that are not coated but are provided with perforations to run on sprockets in the demetallising apparatus to ensure correct registration.

Although the methods according to the invention are primarily intended for the manufacture of capacitors in which the dielectric films are very thin indeed, they are also applicable in the case of much thicker dielectrics, for example, up to 8 or 10 microns thick.

It will be appreciated that in any of the above methods, any dielectric layer may, if desired, be coated on to the backing sheet, or backing sheet and previous layers, in more than one application. Thus, two applications of the same liquid resin may be made, but preferably, the second application is of a different plastic material from the first, such that when the second application is made it will not tend to dissolve the first. As an example, of this latter method, a first application of liquid polystyrene resin may be made, followed by a second application consisting of ethyl cellulose in a solvent such as amyl alcohol.

We claim:

1. A method of making an electrical capacitor including the step of depositing a plurality of layers successively onto at least one surface of strip of an insulating backing material, each successive layer of metallization being separated from the one beneath by the application of a coating of dielectric material over the layer of metallization beneath, the last of said plurality of layers being metallization, said method including the further steps of electrically demetallizing a margin along one side of each layer of metallization to delimit an electrode area on each layer, the demetallization being so conducted that the demetallized margins adjacent electrode areas of the same polarity lie on the same side of the strip, the step of removing the thus formed plurality of layers of metallization and dielectric from the backing strip and the step of winding said plurality of layers into a roll capacitor, the first and last layers being metallization and being connected together to define electrodes of like polarity.

2. A method of making an electrical capacitor including the step of depositing a plurality of layers of metallization successively onto at least one surface of strip of an insulating backing material, each successive layer of metallization being separated from the one beneath by the application of a coating of dielectric material over the layer of metallization beneath, said method including the further step of demetallizing a margin along one side of each layer of deposited metallization to delimit an electrode area on each layer, the demetallization being so conducted that the demetallized margins adjacent electrode areas of the same polarity lie on the same side of said strip, and the step of winding at least the thus formed plurality of layers of metallization and dielectric into a roll capacitor, wherein the composite strip wound into a capacitor roll comprises a strip of backing to which an odd number, being at least three, of layers of electrode metallization are applied, separated by dielectric, on the same side of the backing, the first and last applied metal layers being connected together to constitute electrodes of the same polarity so that the backing is in the field-free space in the roll.

3. A method of making electrical capacitor including the step of depositing a plurality of layers of metallization successively onto at least one surface of strip of an insulating backing material, each successive layer of metallization being separated from the one beneath by the application of a coating of dielectric material over the layer of metallization beneath, said method including the further step of demetallizing a margin along one side of each layer of deposited metallization to delimit an electrode area on each layer, the demetallization being so conducted that the demetallized margins adjacent electrode areas of the same polarity lie on the same side of said strip, and the step of winding at least the thus formed plurality of layers of metallization and dielectric into a roll capacitor, wherein the composite strip wound into the capacitor roll comprises a strip of backing to which layers of electrode metallization have been applied on both sides, together with appropriate dielectric layers, and the two layers of metallization next to the backing on the opposite sides thereof are connected together to constitute electrodes of the same polarity so that the backing is in the field-free space in the roll.

References Cited in the file of this patent

UNITED STATES PATENTS

| 2,390,025 | Deyrup et al. | Nov. 27, 1945 |
| 2,399,798 | Grouse et al. | May 7, 1946 |
| 2,861,321 | Barnard et al. | Nov. 25, 1958 |

FOREIGN PATENTS

| 536,022 | Great Britain | Apr. 30, 1941 |
| 736,479 | Great Britain | Sept. 7, 1955 |